(12) United States Patent
West et al.

(10) Patent No.: US 10,745,880 B2
(45) Date of Patent: *Aug. 18, 2020

(54) GUIDED MULTIPLE PILE DRIVER SYSTEM

(71) Applicant: Ojjo, Inc., San Rafael, CA (US)

(72) Inventors: Jack West, San Rafael, CA (US); David Mar, Berkeley, CA (US)

(73) Assignee: Ojjo, Inc., San Rafael, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/526,829

(22) Filed: Jul. 30, 2019

(65) Prior Publication Data
US 2019/0352875 A1     Nov. 21, 2019

Related U.S. Application Data

(63) Continuation of application No. 15/968,595, filed on May 1, 2018, now Pat. No. 10,422,098.

(60) Provisional application No. 62/492,802, filed on May 1, 2017.

(51) Int. Cl.

| *E02D 5/22* | (2006.01) |
| *E02D 7/06* | (2006.01) |
| *E02D 7/18* | (2006.01) |
| *E02D 7/26* | (2006.01) |
| *E02D 13/04* | (2006.01) |
| *E02D 7/30* | (2006.01) |

(52) U.S. Cl.
CPC .................. *E02D 7/06* (2013.01); *E02D 5/22* (2013.01); *E02D 7/18* (2013.01); *E02D 7/26* (2013.01); *E02D 13/04* (2013.01); *E02D 7/30* (2013.01)

(58) Field of Classification Search
CPC .... E02D 7/06; E02D 7/18; E02D 7/26; E02D 7/30; E02D 5/22; E02D 13/04
See application file for complete search history.

(56) References Cited

U.S. PATENT DOCUMENTS

| 2,142,243 | A | * | 1/1939 | Greenwood | B65H 31/32 |
| | | | | | 414/790.6 |
| 3,344,867 | A | * | 10/1967 | Kupka | E02D 13/04 |
| | | | | | 173/44 |
| 3,830,315 | A | * | 8/1974 | Love | E02D 5/801 |
| | | | | | 173/26 |
| 5,139,366 | A | * | 8/1992 | Choate | E02B 17/0818 |
| | | | | | 254/95 |
| 5,378,085 | A | * | 1/1995 | Kono | E02D 3/126 |
| | | | | | 405/233 |
| 6,039,508 | A | * | 3/2000 | White | E02D 11/00 |
| | | | | | 175/55 |
| 6,142,711 | A | * | 11/2000 | Goughnour | E02D 7/18 |
| | | | | | 405/182 |

(Continued)

FOREIGN PATENT DOCUMENTS

WO    WO-2015110842 A1 * 7/2015

*Primary Examiner* — Benjamin F Fiorello
(74) *Attorney, Agent, or Firm* — Philip D. Mancini

(57) ABSTRACT

A system for simultaneously driving multiple piles into the ground to create A-frame type structures that are anchored by piles running at angles to one another and to the ground. The system comprises a guide assembly and an actuator for driving the piles into supporting ground at the same time. The actuator may engage slots or teeth in the pile to drive them into the ground and/or may apply torque and downward pressure.

16 Claims, 14 Drawing Sheets

(56) References Cited

U.S. PATENT DOCUMENTS

| | | | | |
|---|---|---|---|---|
| 6,179,527 B1* | 1/2001 | Goughnour | ............... | E02D 3/10 |
| | | | | 405/232 |
| 7,392,855 B1* | 7/2008 | White | ................ | E02D 7/10 |
| | | | | 173/135 |
| 7,487,576 B2* | 2/2009 | Baratta | ................ | B23D 47/02 |
| | | | | 175/220 |
| 7,614,823 B2* | 11/2009 | Kim | ................ | E02D 3/103 |
| | | | | 405/232 |
| 8,444,348 B2* | 5/2013 | Nottingham | ........ | E02B 17/0021 |
| | | | | 405/204 |
| 8,714,881 B2* | 5/2014 | Gagliano | ................ | E02D 5/22 |
| | | | | 405/231 |
| 9,518,368 B2* | 12/2016 | Nishioka | ................ | E02D 27/12 |
| 9,850,638 B2* | 12/2017 | Despotellis | ........... | E02D 31/002 |
| 2008/0116427 A1* | 5/2008 | Machu | ................ | B66F 3/02 |
| | | | | 254/97 |
| 2011/0164928 A1* | 7/2011 | Homsi | ................ | E02D 7/16 |
| | | | | 405/232 |
| 2014/0193210 A1* | 7/2014 | Ong | ................ | E02D 7/20 |
| | | | | 405/232 |
| 2016/0348332 A1* | 12/2016 | Talbert | ................ | E02D 5/56 |

* cited by examiner

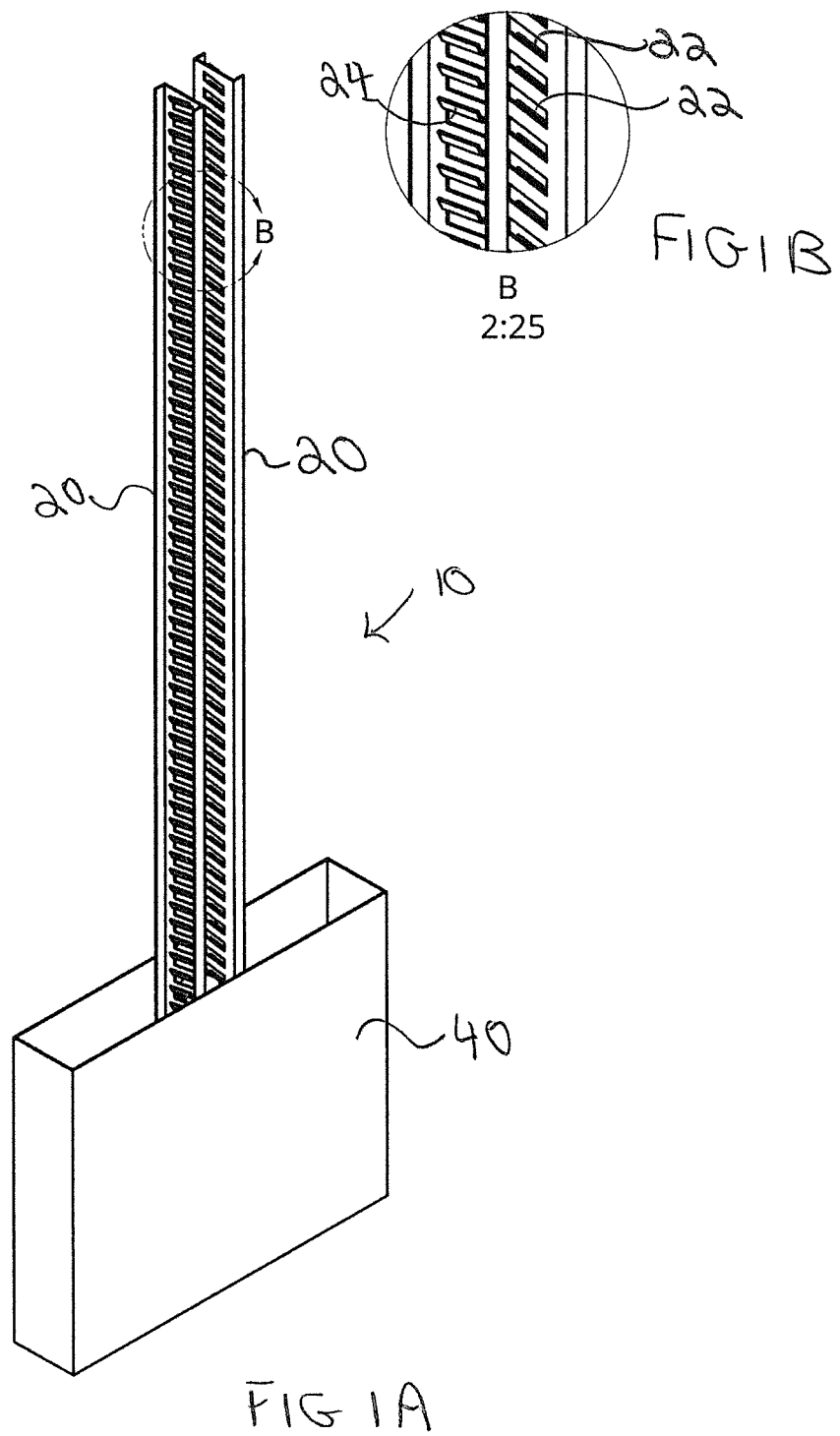

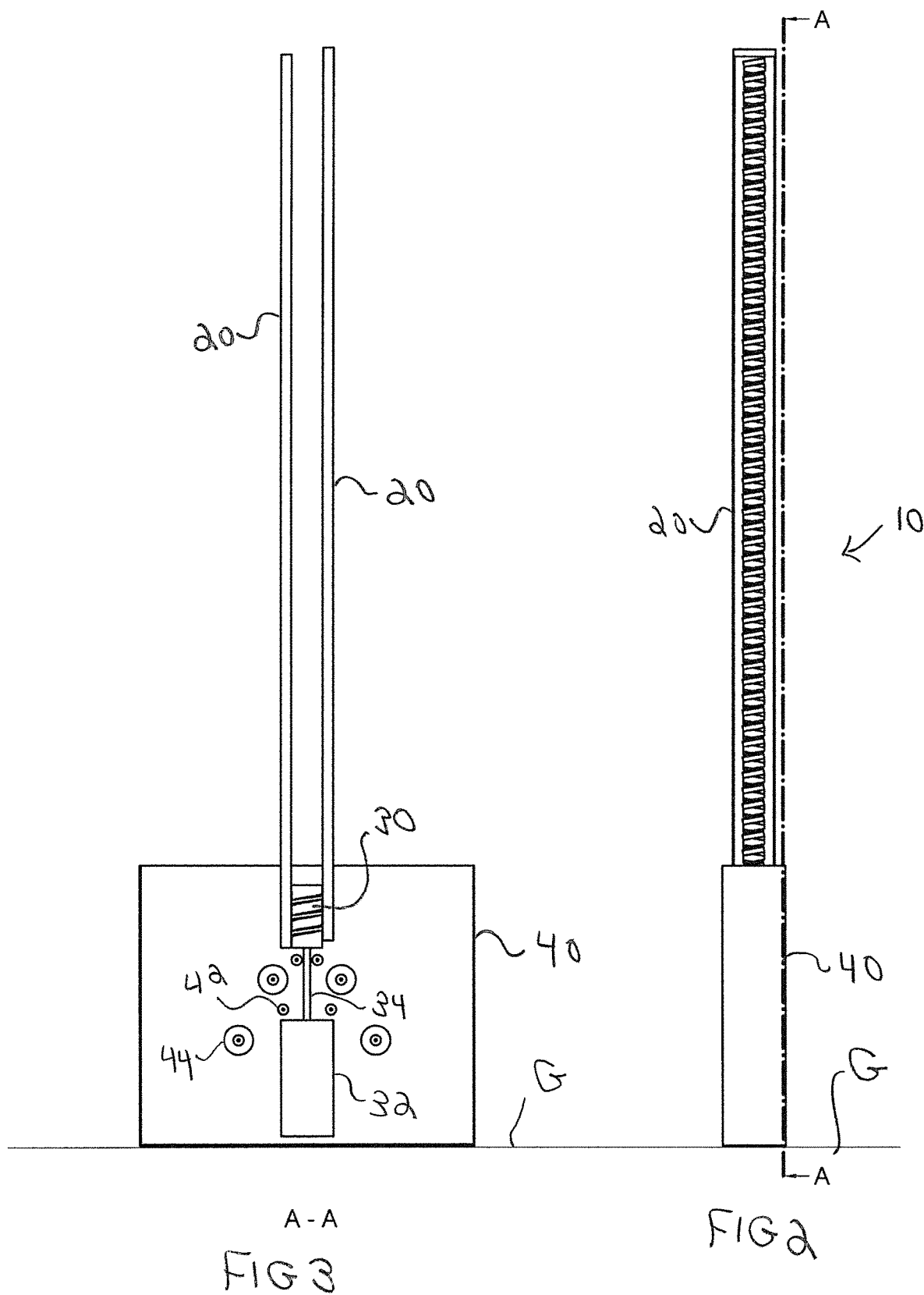

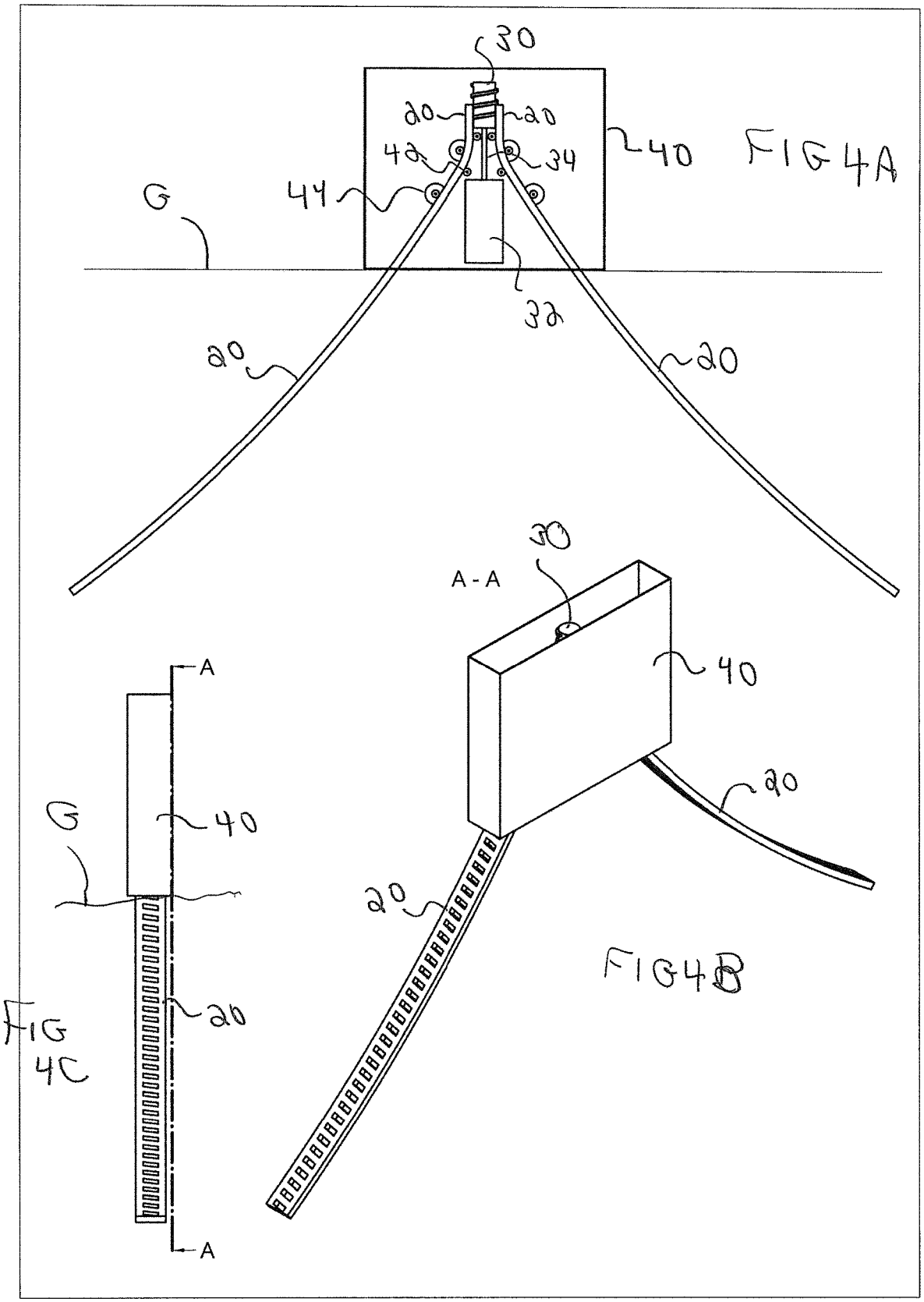

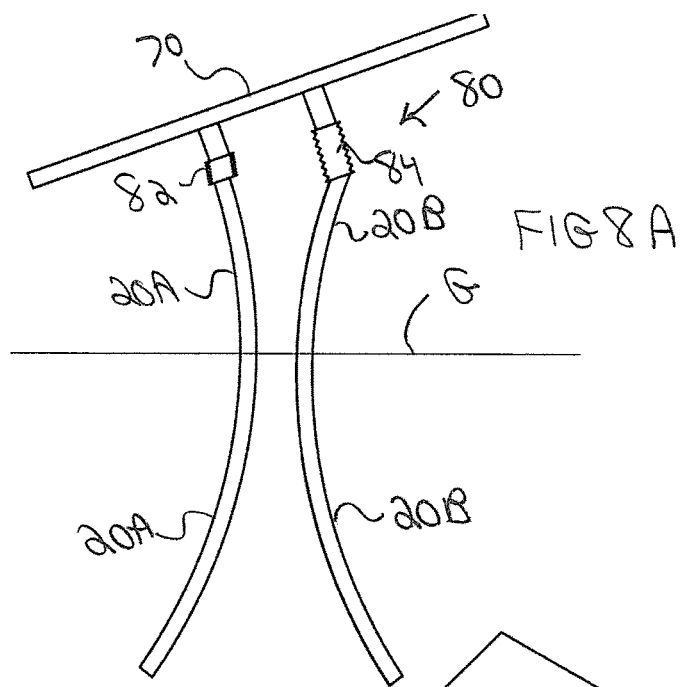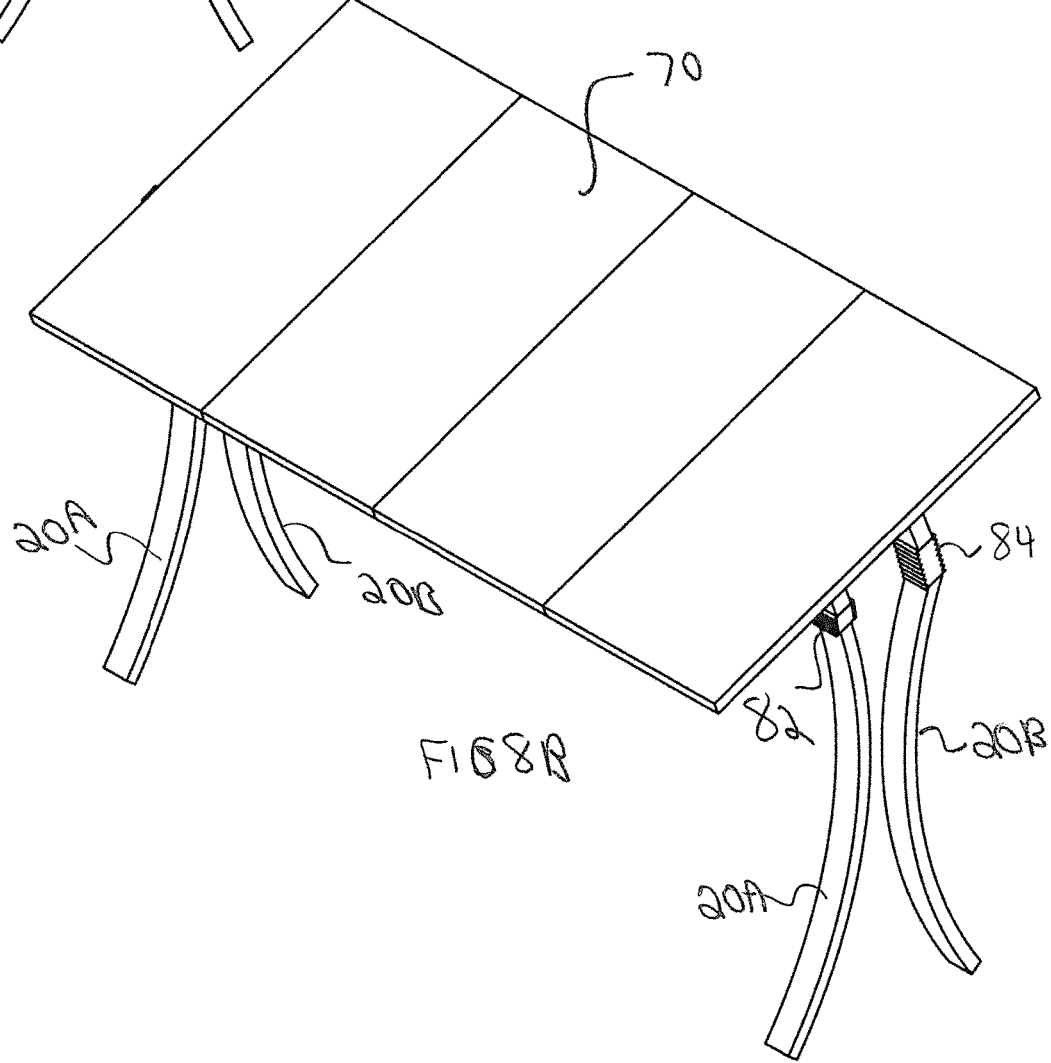

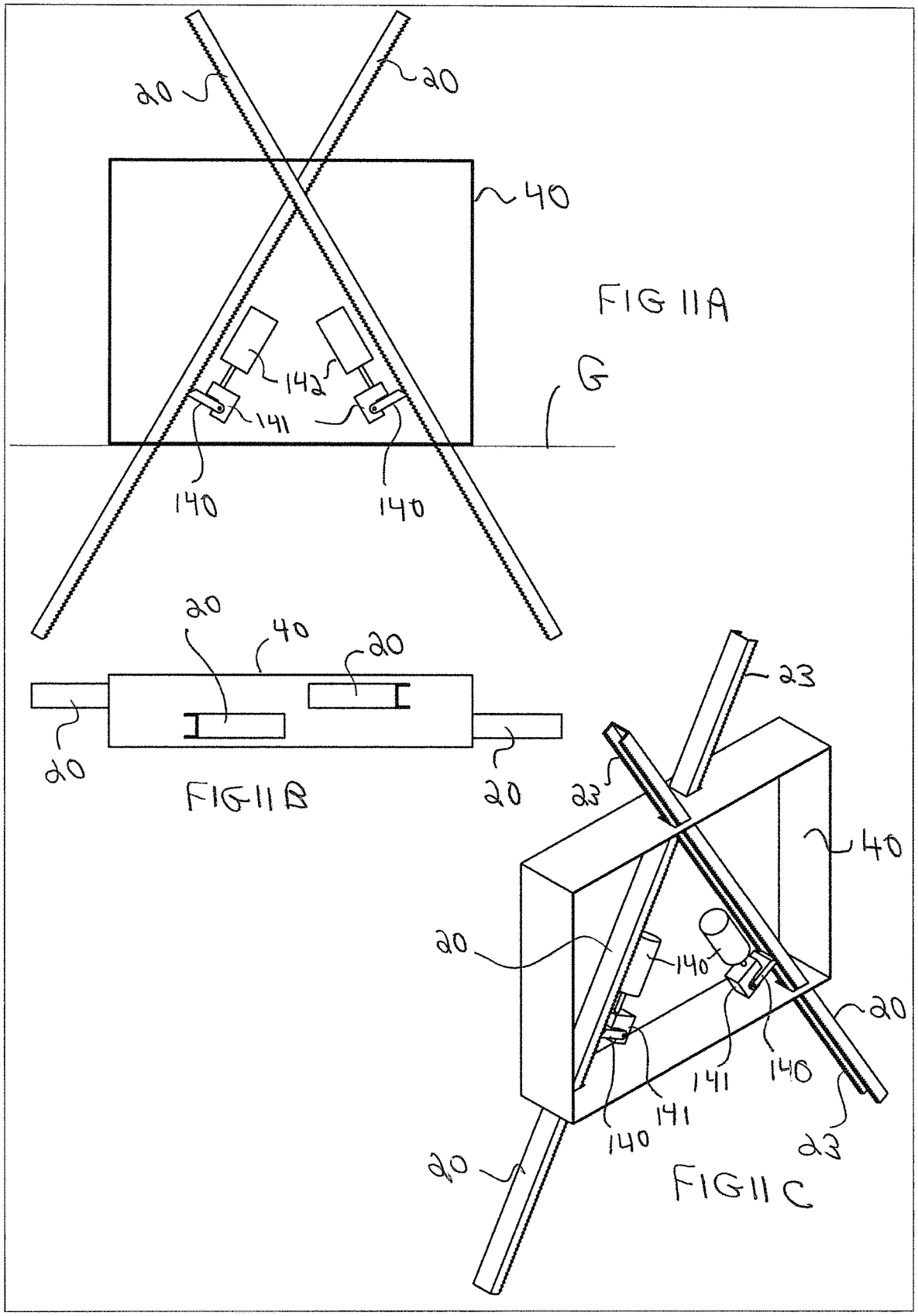

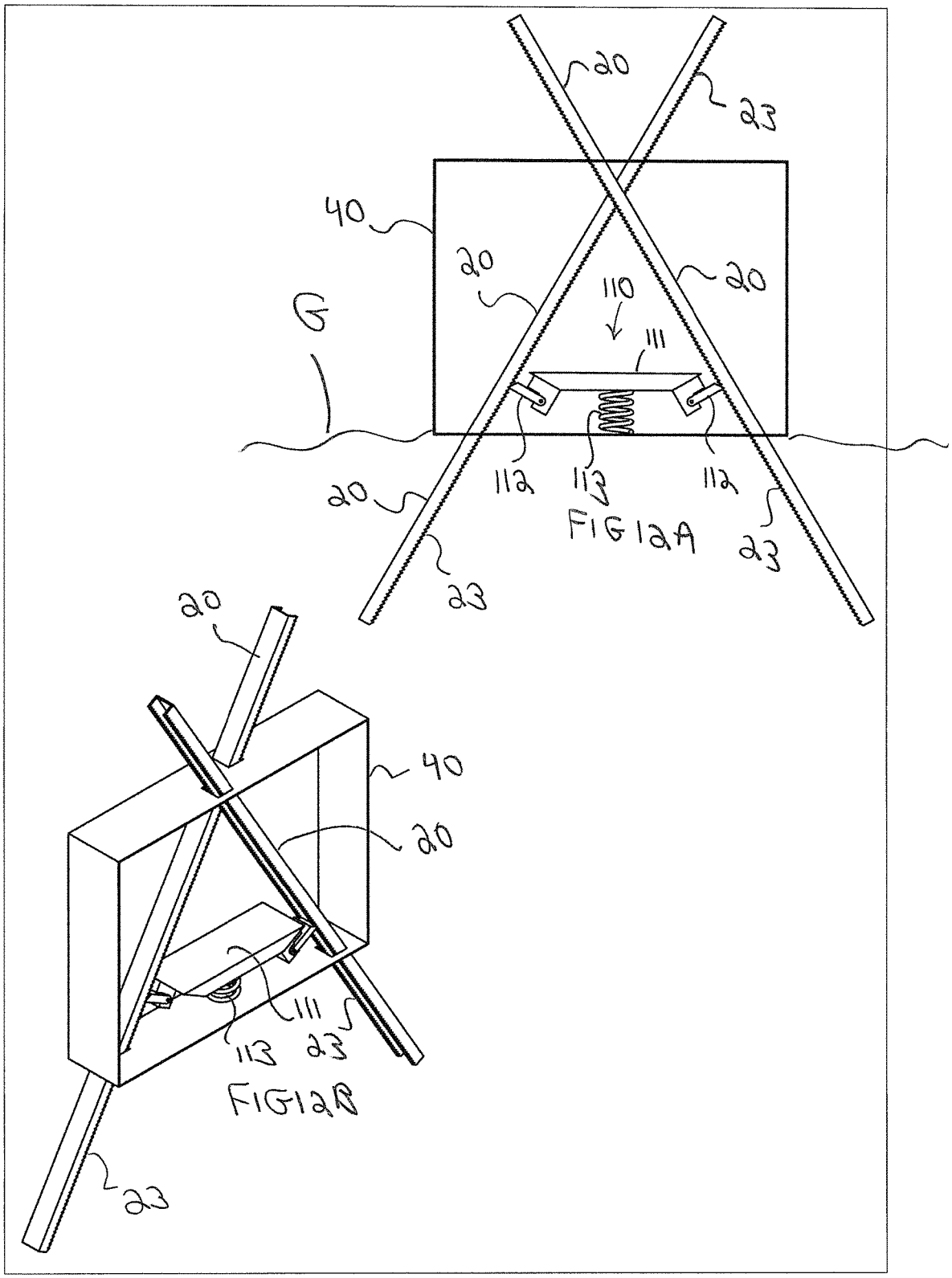

GUIDED MULTIPLE PILE DRIVER SYSTEM

RELATED APPLICATION

The present application claims priority to U.S. Utility patent application Ser. No. 15/968,595, entitled "Guided Multiple Pile Driver System," filed May 1, 2018 which, claims priority to U.S. Provisional Patent Application 62/492,802 entitled "Worm Gear Pile Apparatus and Method," filed May 1, 2017, the disclosures of which are hereby incorporated by reference in their entirety for all purposes.

TECHNICAL FIELD

The present system relates to piles and pile driving systems for driving pilings into the ground.

BACKGROUND OF THE INVENTION

Conventional pilings or piles are elongated members that are made of steel and typically have C-shaped, I-shaped, square or round cross sections and are driven straight down into the ground by repeated impacts with an impact or vibratory hammer repeatedly pounding their top ends. The purpose of these conventional pilings is to later connect equipment and structures thereto. Many different buildings and structures are anchored to the ground with pilings. Such structures may include solar panels, racking, and/or trackers that need to be connected to the ground so that the equipment and structures do not fly away or get destroyed by the wind.

Conventional piles suffer from several disadvantages, including at least the following: (a) piles are quite heavy (to withstand the impact force hitting their top ends) and long and are thus difficult and expensive to transport to and around a job site; (b) pile driving machinery is expensive and slow to drive each pile into the ground, which increases labor costs; (c) driving piles creates noise that can be problematic or be a nuisance; (d) piles are typically difficult to install in the optimal location due to the brute force nature of how they are installed; and (e) piles use more steel than needed to achieve their intended purpose (due to their vertical orientation and their method of installation), thereby increasing cost relative to a more optimized system. Alternatives to conventional driven piles include ground screws, which are expensive to manufacture and frequently require an expensive pre-drilling operation due to the volume of material displaced by the screw. Helical anchors may also be used, but these only work in a limited number of soil types due to poor moment resistance. In the particular case of piling systems for large ground-mounted solar arrays, where a typical job can utilize many thousands of piles, conventional systems are especially problematic due to the extremely large number of piles used on such jobs. Even a small savings in materials and labor per pile is meaningful.

Therefore, what is instead desired is a new system of installing piles that overcomes the above disadvantages of conventional piles. Ideally, such a new system would provide a solid structural foundation using shorter and more lightweight piles, and the piles would be installed in a faster, quieter and cheaper way. As will be shown, the present system overcomes these disadvantages.

SUMMARY OF THE INVENTION

The present pile driving system provides novel piles and pile driving means that seek to reduce the amount of material and labor required to adequately support a structure. We therefore disclose a guided multiple pile driving system for driving piles and creating various pre-determined aboveground and underground structures. Conventional pile driving systems create the simplest possible piling-based structure: a single vertical member. This may not always be the optimum structure to resist loads. Therefore, the present invention provides a pile driving system capable of creating various predetermined underground structures, such as two or more piles separated by a distance, running at angles to each other, and/or curved, and various predetermined aboveground structures, such as two or more piles separated by a distance, running at angles to each other to form an A-frame or quasi A-frame structure, and/or curved. Such predetermined aboveground and underground structures may be formed as a part of the same structural members or via interconnected members. The inventive system thus provides a means to create a predetermined structural shape with driven piles, said shape being more complex than a simple vertical pole and substantially optimized to reduce material and labor required to support a structure such as a solar array, building, etc.

In one embodiment, the present system uses a worm gear to simultaneously install a pair of piles into the ground. Each of the two piles is smaller than a typical conventional pile, and in some cases the total amount of material, such as metal, in the pair of piles of the present invention is less than the total in a conventional pile. In various aspects, the individual piles may be straight or curved. In addition, the present system may be configured to bend straight piles as they are driven into the ground, such that they may be outwardly angled with respect to one another and positioned at an angle to the ground. In some embodiments the underground portion of the pile may be straight and in other embodiments it may be curved. Similarly, the above ground portion may be straight or curved.

The present pile driving system can advantageously be used to drive piles into the ground at an angle to the ground, and in some embodiments a pair of piles may be simultaneously driven into the ground at opposing angles. In contrast with a conventional single pile driven straight down. This provides improved structural stability. In one aspect, an A-shaped frame is formed above ground with the two piles being the sides of the "A". This angled piling approach has the advantage of providing a very stable structure both above and below the ground.

In one aspect, the present system is used to provide piles onto which a solar photovoltaic (PV) array is mounted. It is to be understood, however, that the present system is not so limited to solar arrays and racking, but that its piles can be used for mounting any structure thereon. For example, the present system may be used with buildings, greenhouses, agricultural structures, industrial structures, windmills, etc.

In one aspect, the present system provides a gear driven pile driving system, comprising: (a) a gear; (b) at least one pile having a series of slots therein, wherein the slots are dimensioned to mate with the gear; and (c) a guide assembly for guiding the at least one pile such that rotation of the gear drives the at least one pile into the ground. The gear may be a single worm gear that simultaneously drives both piles into the ground. Other common gears such as pinion gears and rollers are also contemplated within the scope of the present system.

Advantages of the present system include the fact that it can be used to simultaneously drive two or more piles into the ground at the same time, as well as driving these piles into the ground separated from each other and/or at an angle to one another, thereby quickly providing a very solid base on which to build or mount a structure.

Another advantage of the present system is that by separating the material, such as metal, that would otherwise form a conventional pile into two or more pieces allows that material to be more optimally located to resist the particular loads of the structure. For example, in the case of a solar array the loads may comprise a lateral wind load that tends to bend the vertical pile laterally, particularly the above ground portion since it is not supported by the soil. The solar array wind load may further comprise an upward component of the force that results in an uplift that, if strong enough, could pull the pile back up and out of the ground. Thus, in this case the pile must resist lateral bending and vertical uplift. The present system provides and advantage here since it may form an A-frame structure above ground to improve the pile's resistance to lateral forces and it may provide angled and/or curved underground portions which better resist uplift. In some embodiments the underground portions may be elastically bent as they are being inserted into the ground, thus causing the underground portion to preload the surrounding soil, further increasing resistance to pullout. In other embodiments the piles are smaller than conventional piles and thus the soil may cause some elastic deformation of the pile as it is inserted, thus causing advantageous preload on the soil.

Another advantage of the present system is that it is positioned at the lower ends of the piles when first beginning the process of driving a pile. As such, the system is simply positioned at ground level, completely avoiding the use of traditional, noisy impact hammers mounted high up on cranes to drive the piles into the ground. Being low to the ground further improves access and maneuverability, particularly on sites with steeper slopes.

Another advantage of the present system is that it optionally bends the piles as they are driven into the ground. The piles used in the present system may be initially straight or curved, and the present system optionally bends or straightens them as they are driven into the ground, as is required. In some embodiments, piles are loaded straight in from the top, parallel to each other. Then as they are fed through the present pile driving machine, the machine roll-bends the piles to send them into the ground at an angle and/or curvature that increases resistance to the particular loads of the structure being supported. The ability to bend the piles as they are going in may provide advantages, including being easier to ship the piles and move them around on the site when they are straight, then only bending them for enhanced structural performance as needed. Site bending may also provide the advantage of adjustably bending to tailor the angle and/or curvature to the exact requirements of various parts of the structure (loads typically vary across a structure, so optimizing in this way may further reduce material consumption).

Another advantage of the present piling system is that the piles may themselves be formed with barbs extending from their sides to firmly anchor the piles into the ground. Optionally, these barbs may in fact be formed by outwardly bending punched-out sections of the pile that form the series of slots in the pile. Thus, the same basic structure can be used both to form mating slots for the gear, and also to provide directional barbs on the piles themselves.

In alternate aspects, the present system provides a pile driving system, comprising: (a) at least one pile having a series of slots or teeth thereon; (b) a guide assembly for guiding the at least one pile; and (c) an impact force system for engaging the series of slots or teeth, such that a periodic impact force drives the at least one pile into the ground. The impact force system may optionally comprise: an impact force-receiving block; a ratchet on the impact force-receiving block; and a resistance system urging the impact force-receiving block upwardly. As such, periodic impact forces down onto the impact force-receiving block push the pile down into the ground, and wherein the resistance system pushes the impact force-receiving block upwardly between impacts. The piles are thus ratcheted down into the ground. An advantage of this system is that the impact hammer can be mounted down near the guide assembly (at or near ground level), so that it is not required to mount the impact hammer high into the air on the end of a crane. This system may also provide compatibility with current impact drive technology.

In further alternate aspects, the present system provides a worm driven pile, comprising: an elongated body in a hollow or solid configuration and with a section in the shape of a channel, "U", "C", "I", tube, rectangle, circle, ellipse, triangle, etc., with a series of slots extending along the elongated body. The slots are angled and dimensioned to mate with a worm. The slots are optionally disposed at an angle to the sides of the channel-shaped elongated body and may be generally rectangular in shape. The bottom of the pile may comprise a chamfer or angle to aid in the insertion of the pile into the ground.

In alternate aspects, the present system provides a method of driving piles into the ground, comprising: (a) providing a plurality of piles, with each pile having a series of slots dimensioned to mate with a gear; (b) holding the piles with a guide assembly; and (c) rotating a gear, wherein the slots in the piles mate with the gear such that the piles are simultaneously driven into the ground by rotating the gear.

In further alternate aspects, the present system provides a pile driving system, comprising: (a) a pair of piles; (b) a guide assembly, comprising: a housing, a first bending guide in the housing for outwardly bending the piles as the piles pass down through the housing, and an optional second bending guide for at least partially straightening the piles after the piles have been bent outwardly by the first bending guide such that the piles are driven into the ground at substantially opposite angles to the ground; and (c) an actuator for moving the piles through the guide assembly.

In alternate aspects, the present system provides a pile driving guide assembly for simultaneously driving two piles into the ground such that upper portions of the piles form an A-frame shape above the ground and lower portions of the piles are angled with respect to the ground, comprising: (a) a housing, (b) a first bending guide in the housing for outwardly bending the piles as the piles pass down through the housing, and (c) a second bending guide for straightening the piles after the piles have been bent outwardly by the first bending guide such that the piles are driven into the ground at opposite angles to the ground; and (d) an actuator for moving the piles through the guide assembly. As will be shown, the upper portions of the piles form an A-frame shape above the ground and lower portions of the piles are angled with respect to the ground after the driving guide assembly has been removed from the jobsite.

In alternate aspects, the present system provides a pile driving guide assembly for simultaneously driving two piles into the ground such that upper portions of the piles form an A-frame shape above the ground and lower portions of the piles are substantially vertical with respect to the ground, comprising: (a) a housing, (b) a first bending guide in the housing for outwardly bending the piles as the piles pass down through the housing, and (c) a second bending guide for reversing the bend direction and sending the piles into the ground substantially vertically; and (d) an actuator for moving the piles through the guide assembly. As will be shown, the upper portions of the piles form an A-frame shape above the ground and lower portions of the piles are substantially vertical with respect to the ground after the driving guide assembly has been removed from the jobsite.

Another advantage of the present system is that it may use the mechanical benefits of screw threads (as opposed to brute hammering force) to urge the individual piles into the ground. However, in contrast to ground screws (which require additional material to create screw threads on the piles), the present system utilizes the absence of material (i.e. slots) on the pile to mate with a gear that is a part of a reusable tool, and thus does not add cost to every pile on the job. This has the advantage of reducing overall cost (especially when a large number of piles are needed for the structure). In accordance with the present system, the threads on a worm that is connected to a rotational means, such as a drill, mate with slots formed in the piles themselves, effectively allowing the pile to mechanically function like a meshing worm gear. Forming slots in the piles has the advantage of being a relatively low-cost approach. A further advantage of driving piles with a worm is that the direction of rotation of the worm may be easily reversed to pull the pile back out. This is in contrast to piles that are hammered into the ground and required a different component or machine to remove them.

Another advantage is that the individual piles do not have to be as long as conventional piles due to an improvement in the piles ability to resist the loads applied to the structure. The use of shorter piles further saves money in terms of boulder avoidance. In contrast, when a long conventional pile hits an impenetrable rock, the pile may be cut, and another pile may be drilled near it. This may further require the expense of digging a shallow hole down to the boulder, placing a new pile in the hole and filling of the hole with concrete. Furthermore, the shorter piles of the present invention can also be installed faster and with less noise. Shorter and more lightweight piles are also cheaper and easier to transport to the jobsite. The use of two smaller piles (as compared to one conventional larger pile) will reduce the total amount of steel since the steel will be located where it needs to be located to resist the loads on the structure.

In various aspects, the present pile driving system uses piles that are curved. In these optional aspects, the curved piles can also be used to provide a firm stable structure in the ground. In various aspects, the piles can either be pre-bent into curved shapes, or be bent into curved shapes as they are driven into the ground. Another advantage of the present use of curved piles is that it can avoid hitting rocks or boulders by reversing the pile back out, modifying the bend of the pile and re-driving it back down to miss the obstruction. Also, a bent pile will have a greater pull-out resistance than a straight pile (due to the fact that the force pulling it out of the ground will not be acting along its arc of curvature).

In various aspects the present pile driving system drives two or more piles in at opposite angles to each other. Such an arrangement reduces the amount reaction force needed by the pile driving machine to keep the act of pushing the pile downward from lifting the machine off the ground. Further aspects provide a vibratory component such as an impact driver as a part of the rotational component that drives a worm; such vibration loosens the soil, reducing the reaction force as well. It is also contemplated to span between existing piles with a beam to resist uplift of the pile driver in certain cases. Thus, the weight of the pile driving system, optionally along with a vehicle onto which it is mounted, may be sufficient to drive piles without relying on the force of an impact to provide the reaction force.

In various aspects the present invention may be described as a structure formed from piles, comprising first and second piles driven into the ground, wherein portions of each of the first and second piles are disposed both above and below ground level, wherein the underground portions and the aboveground portions comprise substantially different shapes, and whereby said different shapes comprise different structural properties. For example, a curved shape may react to a load placed on a piling differently than a straight shape and thus have a different structural property. A piling at a non-perpendicular angle to another piling may also comprise different structural properties. In further aspects at least one of the aboveground and underground portions of the pilings comprise a non-linear shape, such as a curved shape.

In still further aspects the above ground portions of the first and second piles may comprise an A-frame shape, said shape having an angle between said first and second piles, said belowground portions having a shape that deviates from said angle. For example, the angle between two piles may be an angle between 1 and 60° when they are aboveground, but when the piles are underground the angle may be different or they may change into a non-linear shape with a varying angle therebetween.

In various aspects the present invention may be described as a piling adapted to be driven into the ground to support a structure, said piling comprising a substantially straight aboveground portion and a substantially curved belowground portion.

In various aspects the present invention may be described as a pile driver comprising a first guide, a second guide, and an actuator, said first and second guides for guiding a first pile and a second pile respectively into a portion of ground substantially beneath said pile driver, said first guide adapted to orient said first pile at a positive angle relative to vertical and said second guide adapted to orient said second pile at a negative angle relative to vertical, wherein actuation of said actuator causes said first and second piles to be substantially simultaneously inserted into the portion of ground at approximately said positive and negative angles respectively. The first pile may be inserted into said pile driver at an insert angle, said insert angle being substantially different from said positive angle.

In various aspects the present invention may be described as an A-frame pile driver for inserting two piles into the ground at the same time, such that the above-ground portion of the piles forms an A-frame shape and the below ground portion of the piles run substantially non-perpendicularly.

In various optional aspects, the pile driving system described may be mounted onto a vehicle such as a tractor or truck along with a stack of piles. Furthermore, a pile picking and loading robot can be used as part of the present system, further speeding up installation.

BRIEF DESCRIPTION OF THE DRAWINGS

FIG. 1A is a perspective view of an embodiment of the present gear driven piling system.

FIG. 1B is a close-up view of FIG. 1A, showing barbs and slots formed into the sides of the piles.

FIG. 2 is a side elevation view corresponding to FIG. 1A.

FIG. 3 is a cut-away side elevation view corresponding to FIG. 2, showing two piles received into the top of the device (prior to driving the piles into the ground).

FIG. 4A is a cut-away side elevation view corresponding to FIG. 3 (after the two piles have been driven into the ground).

FIG. 4B is a perspective view corresponding to FIG. 4A.

FIG. 4C is a side elevation view corresponding to FIGS. 4A and 4B.

FIG. 8A is a side elevation view of a system similar to FIG. 7A, but with mechanisms at the top ends of the piles to adjust the height of the sides of the PV array.

FIG. 8B is a perspective view of the structure of FIG. 8A.

FIG. 11A is a side elevation view of an embodiment of the present system for simultaneously driving a pair of straight piles into the ground at an angle to one another.

FIG. 11B is a top plan view of the system of FIG. 11A.

FIG. 11C is a perspective view of the system of FIGS. 11A and 11B.

FIG. 12A is a side elevation view of another embodiment for simultaneously driving a pair of straight piles into the ground at an angle to one another.

FIG. 12B is a perspective view of the system of FIG. 12A.

DETAILED DESCRIPTION

Figure 1C:
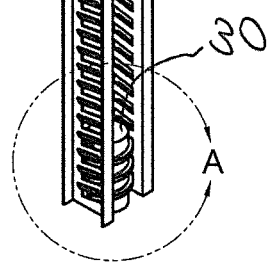
FIG. 1C is a view similar to FIG. 1A, but with the guide housing removed to show the mating of a worm gear to the slots in the piles.
Figure 1D:
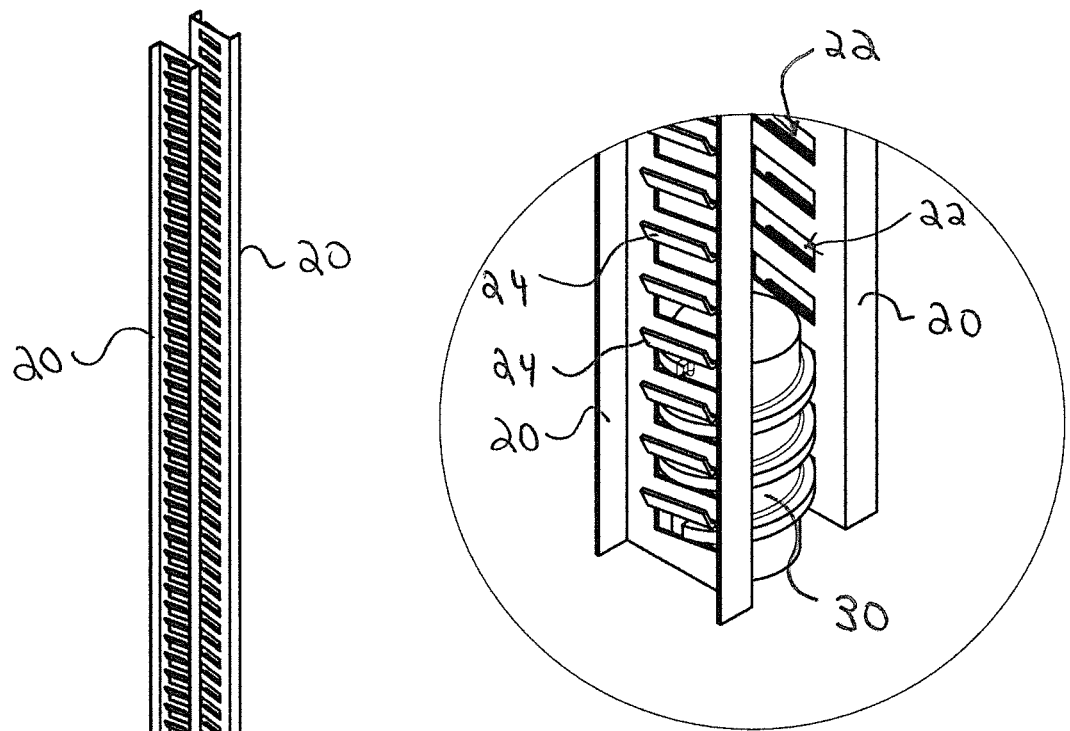
FIG. 1D is a close-up view of FIG. 1C, showing intermeshing of a worm gear and two piles.
Figure 1E:
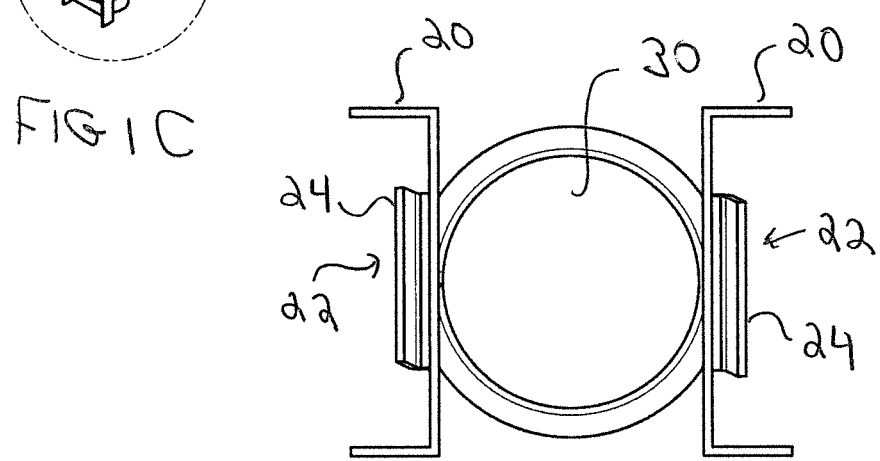
FIG. 1E is a top plan view corresponding to FIG. 1D.

FIGS. 1A to 1E show a basic principle of operation of an embodiment of the present system, as follows. FIG. 1A is a perspective view of the present gear driven piling system 10. FIG. 2 is a side elevation view of system 10 sitting on the ground G. FIGS. 1C, 1D and 1E all show the interaction of a gear or worm 30 with a pair of piles 20, as follows.

The present pile driving system 10 comprises: worm 30; one or more piles 20, and a guide assembly 40, shown here with no top, though such a component is provided in other embodiments. Preferably, a pair of piles 20 is used (although other embodiments are contemplated herein). As seen in FIGS. 1B and 1D, each of the piles 20 have a series of slots 22 cut therein. Slots 22 are specifically dimensioned to mate with the teeth or edges of worm 30. As such, various dimensions and spacings of slots 22 are included in the present system. For example, slots 22 in piles 20 can be substantially rectangular and can be angled with respect to the sides of the pile (to best engage the sides of the particular gear chosen to drive them into the ground). In some embodiments the angle of slots 22 and spacing between slots 22 may match the lead angle and pitch of worm 30 respectively.

As worm 30 is rotated in a first direction, it will simultaneously pull piles 20 downwards, forcing their bottom ends into the ground. Specifically, guide assembly 40 supports piles 20 such that rotation of worm 30 drives the lower ends of piles 20 into the ground. This is advantageous in that only one worm 30 is used to drive two piles 20 at the same time. Preferably, worm 30 is positioned within guide assembly 40, as shown.

As seen in FIG. 1D, slots 22 may be formed by stamped out portions being upwardly turned to form a series of barbs 24. Barbs 24 advantageously provide resistance to backward movement, thus making it difficult to pull piles 20 back up and out of the ground after they have been driven down into the ground.

In preferred aspects, gear 30 is a worm as illustrated. It is to be understood, however, that gear 30 could also be one or more pinion gears or similar (that could mesh with teeth on piles 20) or even a roller or series of rollers acting on the sides of piles 20 to pull them down into the ground. The direction of rotation of gear 30 may also be reversed to pull piles 20 back out of the ground if an obstruction is encountered.

As illustrated, the present system is ideally suited to simultaneously drive a pair of piles 20 into the ground. It is to be understood, however, that the present system can also be used to drive one pile or simultaneously drive three (or even more) piles into the ground. As seen in the present illustrations, one worm 30 can be used to drive two piles 20 down into the ground. It is to be understood that the present system can, for example, be used to simultaneously drive three piles down into the ground (by placing the three piles 120 degrees apart from one another equidistantly around the worm). If three piles are used, they can be bent outwardly to form a tripod shaped base both above and/or under the ground.

As can be seen in FIGS. 2 and 3, guide assembly 40 is typically positioned on (or near) the ground. As such, guide assembly 40 supports a lower end of piles 20 at or near ground level. This novel approach has many advantages since the present pile driving system (including its gearings, drive shaft, etc.) can all be positioned within in housing 40, and thus be located at or near the ground, reducing size and expense and increasing mobility. Alternatively, guide assembly 40 can be secured to the back or side of a vehicle. Even in this case, it would still be comparatively near the ground; it may also be movable up and down from a position on a vehicle, raising to move and dropping to install pilings. In traditional pile driving systems, this is simply not the case since. Traditional systems instead require that a large hammer mechanism be lifted high up into the air to hammer down onto the tops of the piles. This traditional approach is cumbersome, noisy and somewhat dangerous. In contrast, the present "driven down at ground level" system is both quieter and less dangerous to operate.

Figure 5:
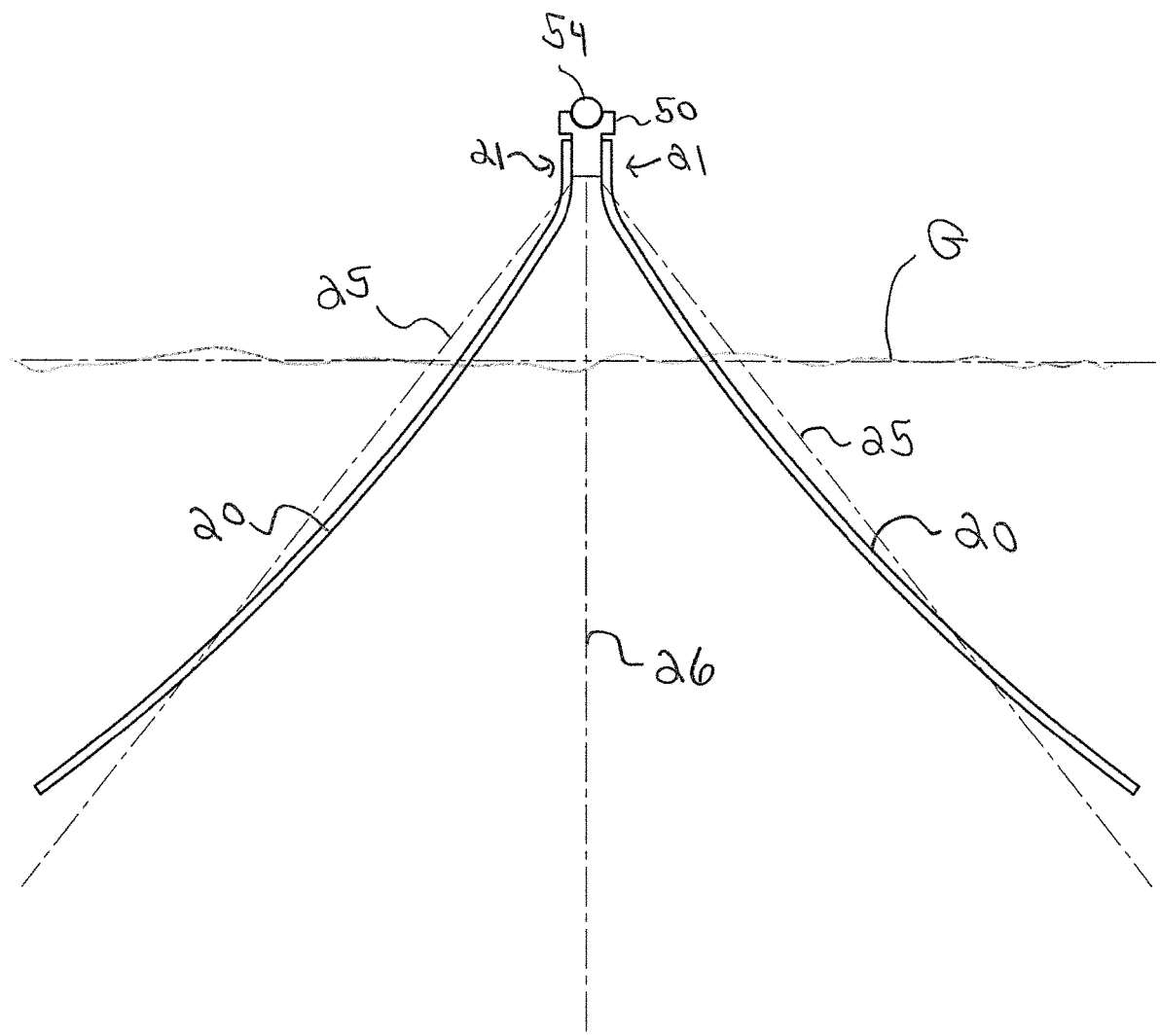
FIG. 5 is a side elevation view showing the positions of the piles both above and below ground after the removal of the guide assembly from the jobsite.

FIGS. 3 to 5 show a unique property of the present system in which a pair of piles are driven into the ground both at a non-vertical angle to the ground, and at outward angles to one another, as follows. FIGS. 3 and 4 show the operation of various components within guide housing 40, to bend piles 20 outwardly as they are driven into the ground, as follows.

In FIG. 3, piles 20 are positioned in parallel to one another and meshed with worm 30. Guides in the top of housing 40 may help to align piles 20 with worm 30 and prevent them from splaying outward. Next, motor 32 is activated, thereby turning drive shaft 34, which in turn causes worm 30 to rotate. The rotation of worm 30 will pull the bottom ends of piles 20 downwardly.

It is to be understood that motor 32 and drive shaft 34 need not be positioned within housing 40. For example, motor 32 and drive shaft 34 may instead be removable, or be housed in, or separately mounted to, a vehicle as stated above. Moreover, housing 40 may itself be mounted to the vehicle. It is to be understood, therefore that the present system encompasses any system for rotating a gear 30 to move piles 20, whether or not that entire gearing system is physically enclosed within housing 40 and whether or not housing 40 is positioned in contact with the ground or with a vehicle.

Motor 32 may further comprise an impact driver, hammer drill, or the like to deliver vibrations into pile 20 and thereby serve to loosen the soil.

As seen by comparing FIGS. 3 and 4A, the passage of piles 20 through guide assembly 40 bends the piles as they are driven into the ground. In optional embodiments, guide assembly 40 comprises a first roller 42 (or other suitable bending guide surface) positioned to bend the pile outwardly at an angle. An optional second roller 44 (or other suitable bending guide surface) can also be used to straighten the pile (i.e.: bend the pile the other direction) such that the straightened pile is then driven into the ground at an angle as seen in FIG. 4A. Other guides, surfaces or rollers may be provided depending on the exact bends required. FIG. 3 shows additional rollers 45 and a mirror image of rollers 42, 44, 45 on the opposite side for achieving a similar but opposite bend on the opposing pile 20.

In the embodiment as shown in FIG. 3, rollers 42, 44, 45 may be adjustably positioned by the operator to vary the bend on pile 20. For example, if the pile is reversed back out to avoid a boulder, as described above, the position of rollers 42, 44, 45 may be altered to send the pile back down in a different direction, thus avoiding the obstruction. It may also be beneficial to alter the bend on pile 20 to customize the exact underground shape to the type of soil or the direction of loads on pile 20. For example, sandy soil may require deeper penetration than denser soils, and thus less curve and deeper reach would be preferred. In other embodiments rollers are provided in fixed or standard configurations.

Ground level G is also illustrated in FIG. 4A. FIG. 4B shows a corresponding perspective view and FIG. 4C shows a corresponding side elevation view of the system with piles 20 fully driven into the ground.

In various embodiments, the present system therefore drives either straight or curved piles 20 into the ground. Optionally, piles 20 have a C-shaped cross section, but they may have I-shaped, rectangular, triangular, square or circular cross sections as well, or simply be ribbon shaped (i.e.: planar without side walls) all keeping within the scope of the present system.

In various aspects, piles 20 may be straight piles that are bent outwardly by the present system, and/or be positioned in curved or straight paths under the ground. As will be shown, the present system can also result in a pile that is curved over one portion of its length and straight over a different portion of its length.

After the piles 20 have been driven to the position shown in FIG. 4A, guide housing 40 can then be removed, thereby leaving piles 20 as shown in FIG. 5. As can be seen, piles 20 have both straightened and curved portions. For example, their top ends 21 can be positioned parallel to one another. The wide-outwardly-angled portions of piles 20 under the ground G will provide a very firm support for structures built thereon. For example, a mounting saddle or yoke 50 can be fastened to top ends 21 of piles 20, as shown. Next, a torque tube 54 can be placed in yoke 50. A photovoltaic (PV) array 70 can be mounted onto torque tube 54 as further illustrated in FIGS. 6A and 6B. In operation, torque tube 54 is rotated in yoke 50 to adjust the angle of PV array 70 with respect to the sun (for example, to track the sun in its passage across the sky).

In some embodiments one or multiple rollers such as 42, 44, and 45 may be driven by a motor. In such embodiments motor 32 may be oriented 90° from the orientation shown in FIG. 4A and may directly or indirectly drive a roller which via friction or via a pinion or other gear engages with piles 20 to drive piles 20 into the ground.

FIG. 5 further shows two angled dashed lines 25 which represent the possible installed location of piles 20 in a case where guide assembly 40 and/or attachment to yoke 50 are utilized to straighten piles 20 back out. For example, additional rollers may be provided in guide assembly 40 reverse the bend provided by roller 42. In this case piles 20 may comprise a relaxed shape that is straight as dashed lines 25 indicate or piles 20 may comprise a relaxed shape that is curved but being held straight by the ground and/or yoke 50. In the latter case, piles 20 are preloaded which may improve pull-out resistance and/or resistance to lateral loads.

FIG. 5 also shows centerline 26, which helps to illustrate how the A-frame shape of piles 20 differs from a conventional pile that would be inserted roughly along this line, as will be discussed further below.

Figure 7A:
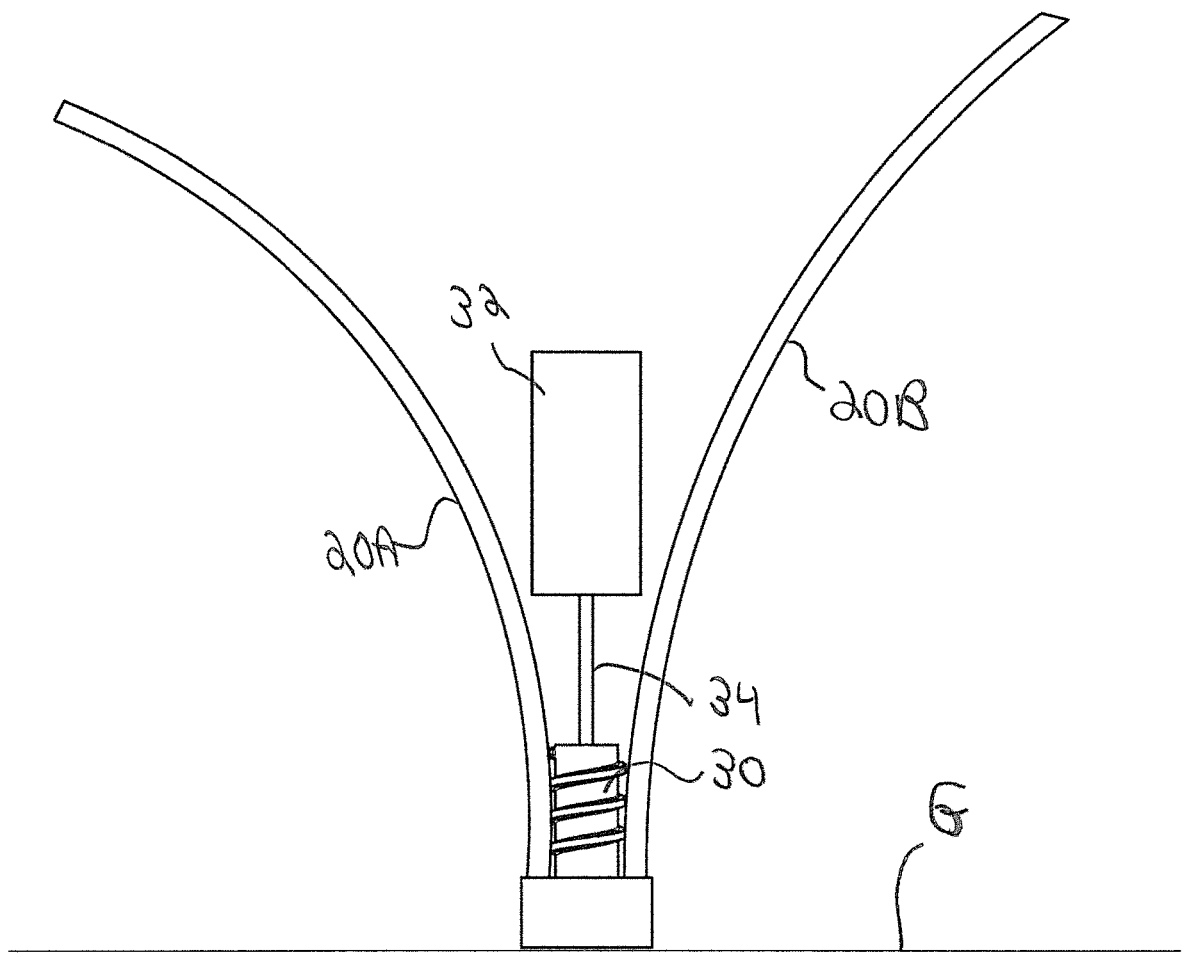
FIG. 7A is an elevational schematic view showing the present system driving two pre-curved piles into the ground (with the guide housing removed for ease of illustration).
Figure 7B:
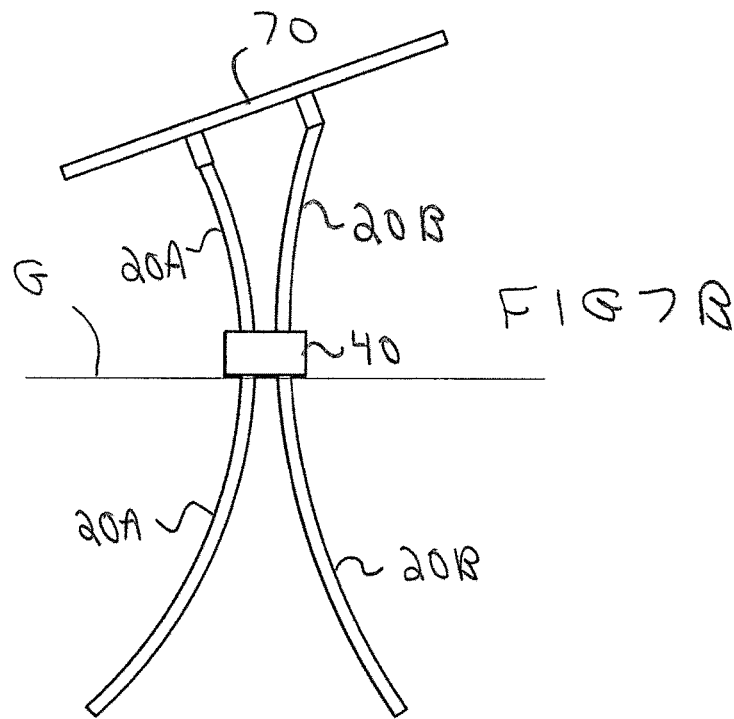
FIG. 7B is a side elevation view of system of FIG. 7A, showing a PV array mounted onto the tops of the piles, also showing the position of the piles both above and below ground.
Figure 7C:
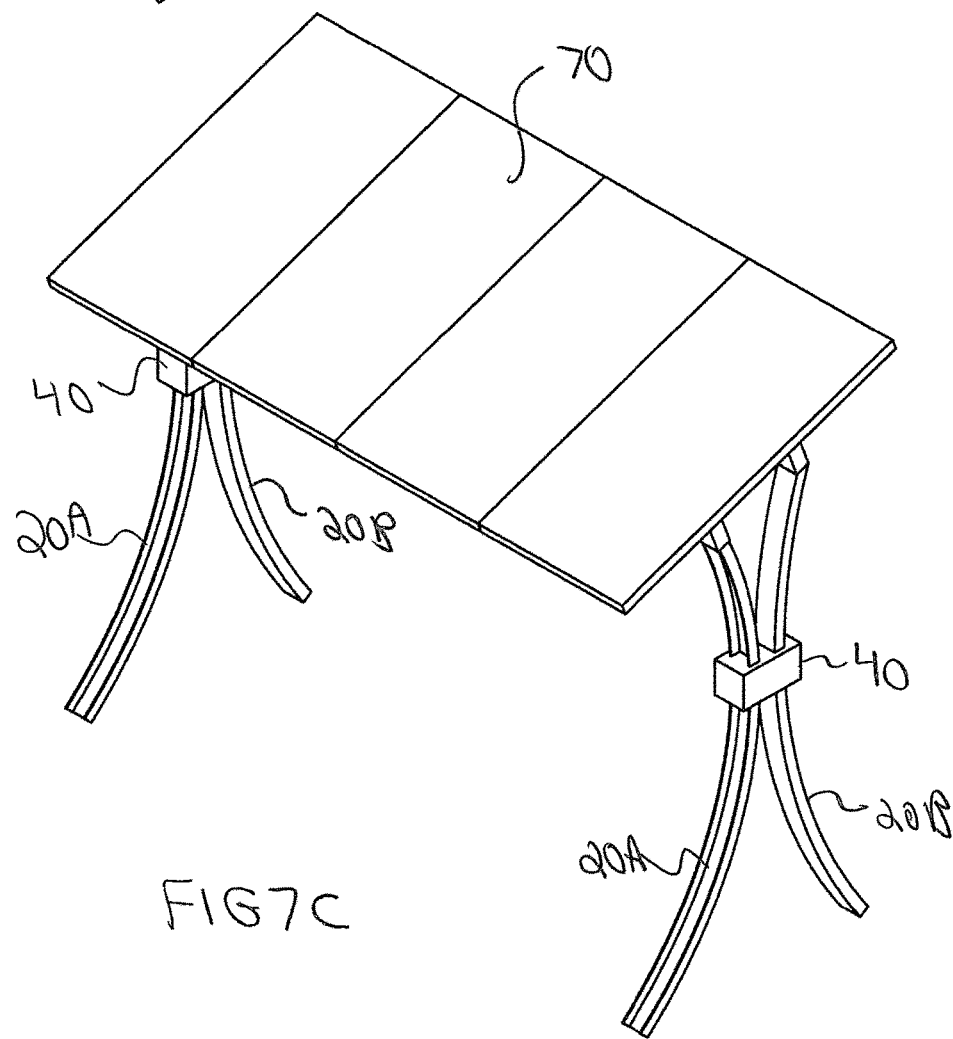
FIG. 7C is a perspective view of the structure of FIG. 7B.

FIGS. 7A to 7C show an optional system for driving two pre-curved piles into the ground and mounting a PV array on top, as follows. FIG. 7A shows the positioning of curved piles 20A and 20B prior to these piles being driven into the ground. Housing 40 in this embodiment is reduced in size such that worm 30 and motor 32 are located outside of it. Housing 40 may remain in place after pile installation and may further comprise a compression or retainer element that serves to compress piles 20 together and to compress the nearby soil together as well, thus enhancing the structural support provided by the system. Please note that bearings as are typical in the art to support and anchor loads on worm 30 are not shown, yet such typical arrangements are within the scope of the present invention. As will be explained, piles 20A and 20B may have slightly different lengths and even different arcs of curvature. Motor 32 turns drive shaft 34 which in turn rotates worm 30, thereby pushing the lower ends of piles 20A and 20B down into the ground until the piles reach the position shown in FIGS. 7B and 7C. Specifically, each of piles 20A and 20B will be firmly anchored into the ground (with their lower ends pointing away from one another, as shown). In this particular embodiment, it is not necessary for housing 40 to contain any guides (such as rollers 42 or 44) that were previously used to bend the piles. Instead, the piles 20A and 20B are simply pre-curved piles that are allowed to advance in a curved path into the ground (in keeping with their curved shape). As seen in FIGS. 7B and 7C, a PV array 70 can be mounted onto the top ends of piles 20A and 20B. As can also be seen, piles 20A and 20B can be pre-shaped and positioned such that their top ends are at different heights from one another when fully driven into the ground. This has the advantage of holding PV array 70 at an angle to the ground. In accordance with the present system, various optional systems, mechanisms and actuators can be added (at the top ends of piles 20A and 20B) to adjust the angle of the PV array 70 with respect to the sun. Optionally, some of these mechanisms may continuously adjust the angle of PV array 70 over the course of the day to track the sun across the sky.

FIGS. 8A and 8B illustrate a system similar to FIGS. 7B and 7C, but further include a positioning system 80 comprising a pair of actuators which can be contracted (82) or expanded (84) to adjust the angle of PV array 70.

Figure 9A:
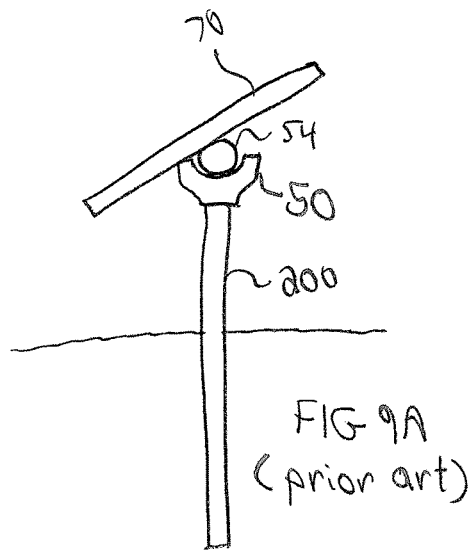
FIG. 9A is a schematic of a PV array mounted onto a prior art pile.
Figure 9B:
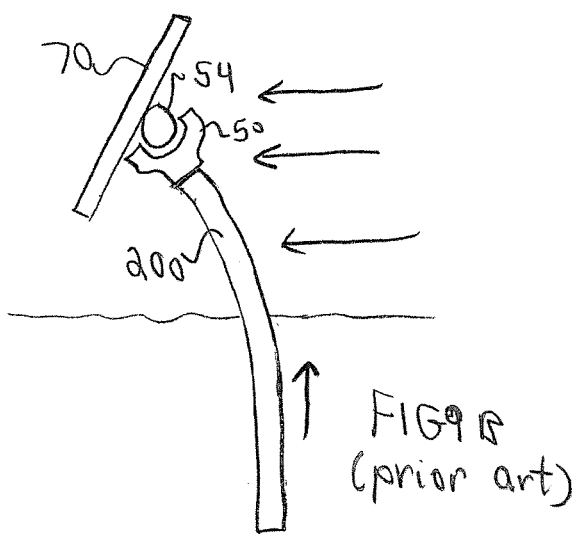
FIG. 9B illustrates the system of FIG. 9A under wind loading.
Figure 10A:
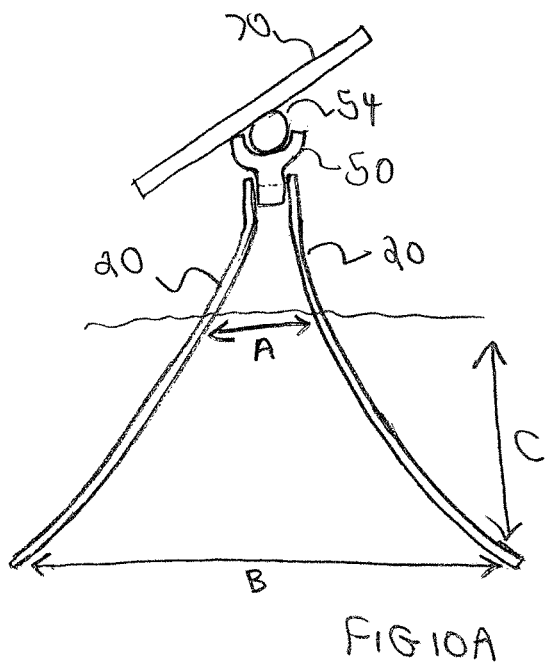
FIG. 10A is a schematic of a PV array mounted onto piles installed by the present system.
Figure 10B:
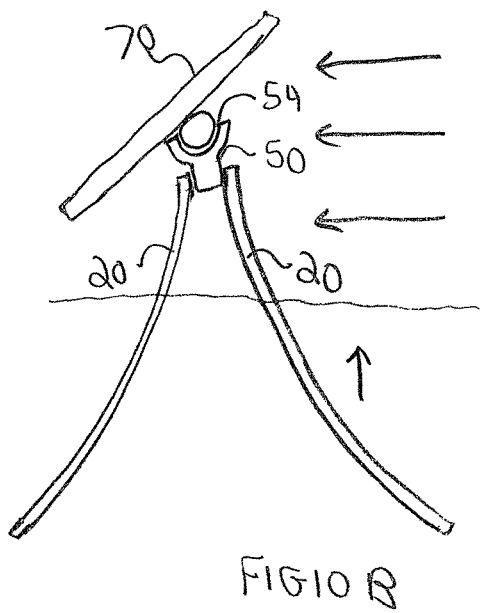
FIG. 10B illustrates the system of FIG. 10A under wind loading.

FIGS. 9A and 9B illustrates a prior art system with a PV array 70 mounted onto a traditional vertical pile 200. As seen in FIG. 9B, wind loading (indicated by horizontal arrows) may cause lateral bending on pile 200 and may further result in an uplift force (indicated by a vertical arrow). In contrast, the present system as seen in FIGS. 10A and 10B has piles 20 spaced far apart at an angle to the ground G and at an angle to one another (spaced at distance A at ground level, and at larger distance B further underground). This A-frame structure approach provides a much more solid structure that is much more resistant to wind and wind uplift loading forces. Therefore, in order to properly resist a given wind load, the present system may use substantially less steel in piles 20 (FIGS. 10A and 10B) as compared to a single large pile 200 in the prior art system (FIGS. 9A and 9B). Moreover, the depth C of present piles 20 may not need to be as deep as traditional prior art pile 200. This makes it easier to avoid deep boulders underground and reduces material consumption.

FIGS. 11A to 11C illustrate an embodiment of the present system for simultaneously driving a pair of straight piles into the ground at an angle to one another, as follows. A pair of straight piles 20 having C-shaped cross sections are provided (shown partially driven). Piles 20 each have teeth 23 cut into their side edges. A guide housing 40 is provided (with offset top and bottom openings for the piles to pass through). Guide housing 40 may be placed on the ground G as illustrated. Inside housing 40 is a pair of ratchets 140 that are connected to a pair of pneumatic pistons 142. Ratchets 140 are also rotatably connected to blocks 141 and are spring biased to remain in an upwardly rotated position, as shown. The spring biasing keeps ratchets 140 rotated upwardly such that they grip onto teeth 23. In operation, pneumatic pistons 142 cause ratchets 140 to move downwardly, thereby pushing piles 20 downwards. Next, when pneumatic pistons 142 pull blocks 141 upwardly, ratchets 140 will slip over teeth 23. As a result of ratchets 140 pivoting back and forth as they are moved up and down, piles 20 are driven down into the ground. As a result, when housing 40 is removed, piles 20 will again form the advantageous A-frame support structure as described above. Moreover, as can be seen in FIG. 11B, piles 20 are offset from one another (so that they are able to pass by one another without contacting one another). Once guide housing 40 has been removed in the field, the offset top ends of piles 20 can optionally be bent into contact with one another (for example, being bent into the orientation similar to that shown in FIG. 6B).

In alternate embodiments, pneumatic pistons 142 can be replaced with a pair of worm gears, or pinion gears (with the piles being the rack in a rack and pinion system), or with rollers to drive piles 20 down into the ground (using any of the systems described herein). Moreover, in further alternate embodiments, a single worm may be used to simultaneously drive the pair of piles 20 down into the ground. In this embodiment, the worm may be positioned near the side-by-side intersection of the two piles (i.e.: close to the top of housing 40 as presently illustrated) so that the worm makes contact with both piles 20 simultaneously.

FIGS. 12A and 12B are similar to the embodiment of FIGS. 11A and 11B, but instead use an impact force system instead of a gear to drive piles 20 into the ground. Each pile 20 has a series of teeth 23 running thereon; a guide assembly 40 for supporting the at least one pile at a lower end of the pile at ground level; and an impact force system 110 for engaging the series of teeth 23, such that a periodic impact force drives piles 20 down into the ground.

Impact force system 110 optionally comprises: an impact force-receiving block 111; a pair of ratchets 112 (wherein the ratchets are each spring biased to the upward position shown). A spring 113 is provided to urge block 111 upwardly. Ratchets 112 mate with teeth 23. When block 111 is pushed downwardly (for example by an impact hammer, or other such system for delivering periodic impacts to the top of block 111), piles 20 will also be pushed downwards. In the intervals of time where block 111 is not pushed down, it will spring upwardly with the ratchets 111 sliding up over teeth 23. As can be appreciated, periodic impact forces down onto block 111 will push the piles 20 downwards into the ground, with the resistance system 113 pushing the impact force-receiving block 111 upwardly between such impacts. In various optional aspects, an impact driver can be used to periodically push down on the impact force-receiving block. The impact driver may optionally be a vibratory hammer or a hammer drill.

Figure 13A:
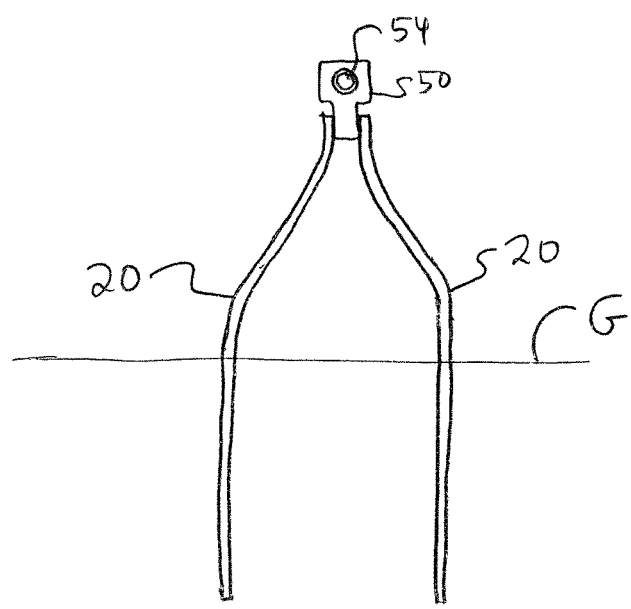
FIG. 13A is a side elevation view of an embodiment with reverse bent piles.

FIG. 13A shows an embodiment similar to that of FIG. 5, except that guide assembly 40 forces a reverse bend in piles 20 that results in piles 20 going substantially straight down into the ground.

Figure 13B:
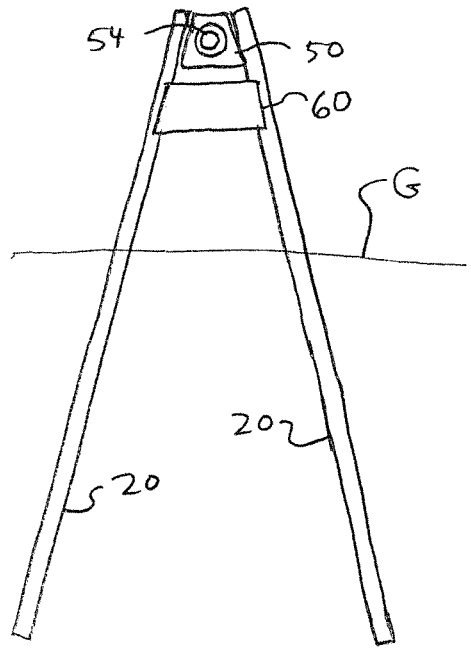
FIG. 13B is a side elevation view of an embodiment using straight piles to form an A-frame structure.

FIG. 13B show an embodiment wherein substantially straight piles 20 form an A-frame structure above ground as described above. However, this embodiment further comprises an optional gusset 60 for increasing resistance to torque loads about the axis of torque tube 54. For example, it is common in the mounting of solar arrays on torque tubes for some yokes 50 to see little or no torque as torque tube 54 spins relatively freely inside a bearing in yoke 50; yet other yokes may be presented with a torque load if a brake, motor or other actuator is connected to yoke 50. In this latter case a wind load may deliver torque to yoke 50 which is translated to piles 20. Thus, the embodiment of FIG. 13B provides a stiff plate, such as gusset 60, connected to piles 20 to resist torque loads. Since it is common for only some piles in an installation to have significant torque loads while others do not, the present invention enables a simple add-on gusset 60 to increase torque resistance where needed, instead of the conventional technique of increasing the size and depth of the entire pile. This technique may save material and labor. In other embodiments increased torque resistance is provided by adding a third or fourth pile at the same location as described above.

Figure 14:
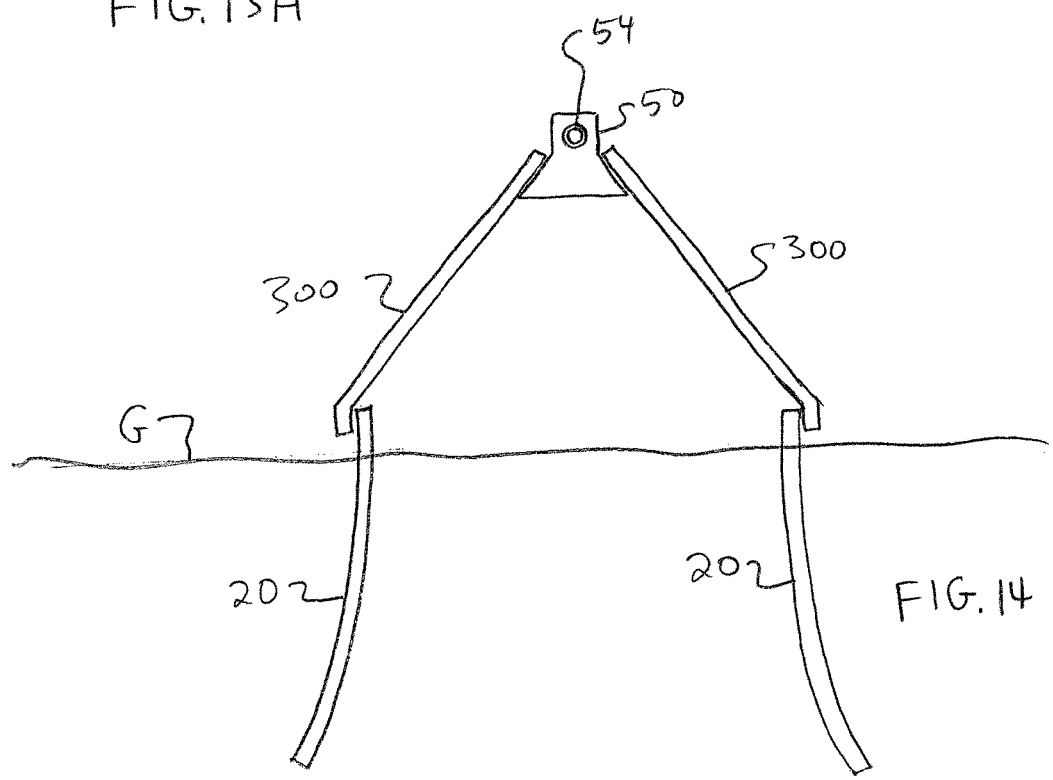
FIG. 14 is a side elevation view of an embodiment using studs to form an A-frame structure.

FIG. 14 shows an embodiment of the present invention wherein piles 20 are driven most of their length into the ground G and then connected to studs 300 which form the A-frame shape up to yoke 50. An advantage of this embodiment may be that further material savings may be realized by making the above-ground portion of the pile system from a different size member than the below ground portion.

Figure 6A:
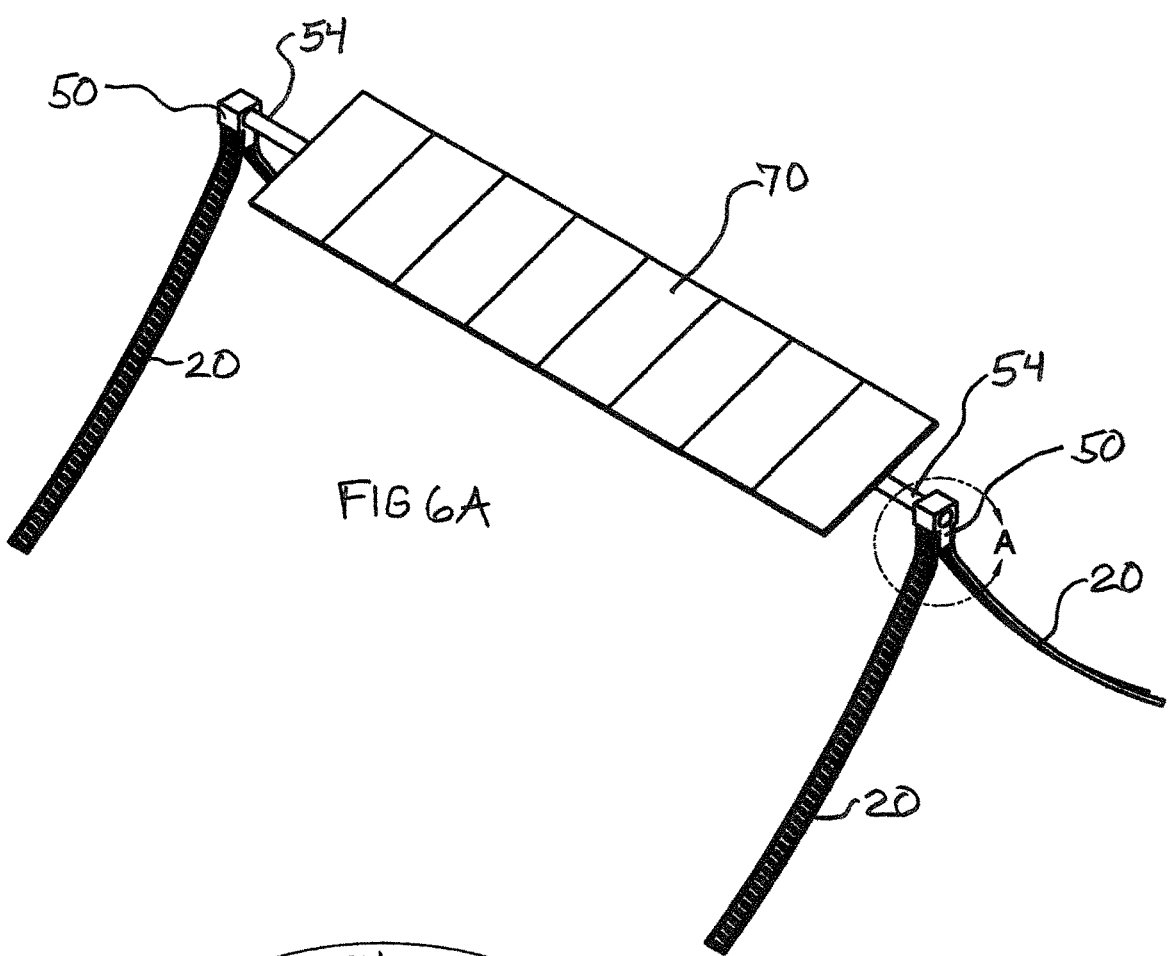
FIG. 6A is a perspective view of a solar PV system mounted onto the piles of FIG. 5.
Figure 6B:
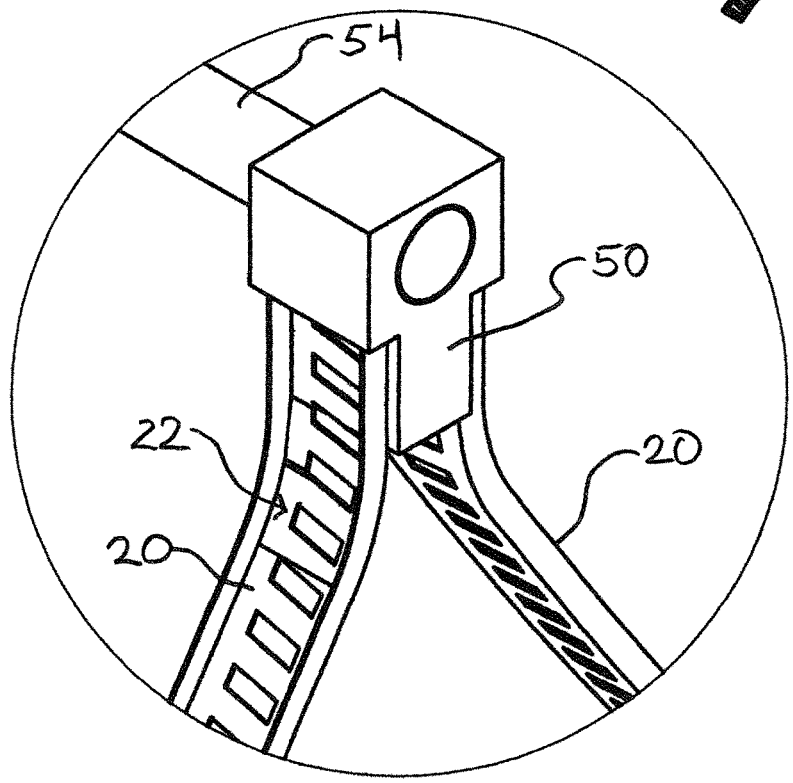
FIG. 6B is a close-up view of the mounting of the solar PV system of FIG. 6A.
Figure 15:
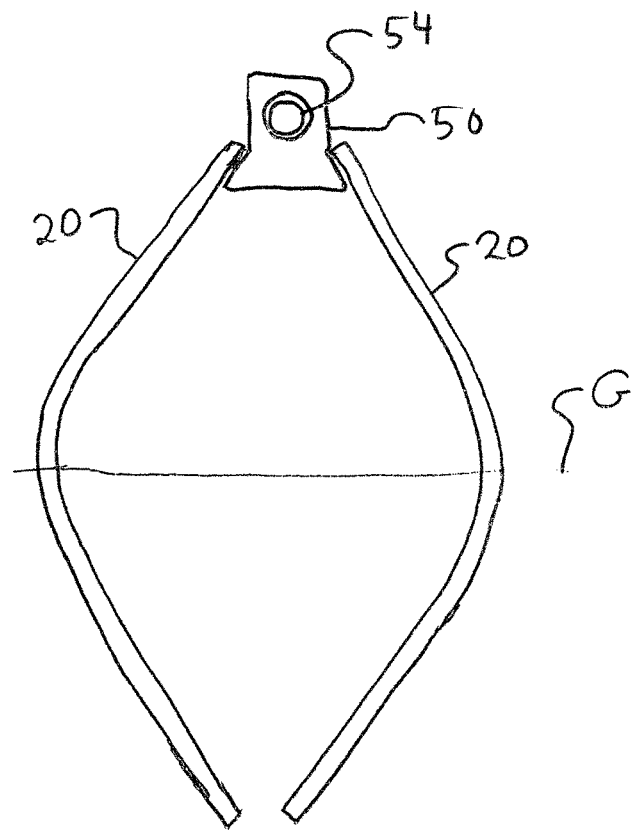
FIG. 15 is a side elevation view of an embodiment with an angled yoke.

FIG. 15 shows an embodiment of the present invention similar to the embodiment of FIGS. 5, 6A and 6B, with some differences. Yoke 50 is angled such that piles 20 maintain their angle when connecting to yoke 50. This feature may be realized by a different configuration of guides and/or rollers in guide assembly 40 such that piles 20 are inserted at an angle or inserted horizontally and then bent downward by guide assembly 40. Various configurations of guides and rollers that result in various shapes for the aboveground and belowground portions of pile are all within the scope of the present invention.

FIG. 15 further shows piles 20 curving back toward each other underground. As described above this may be achieved by bending piles 20 in guide assembly 40 or piles may be pre-bent and fed through already curved, the latter may include an offset, as described above, to prevent piles 20 from interfering with each other during installation. Once installed and guide assembly 40 is removed, as depicted in FIG. 15, piles 20 may provide an optimized structural system for resisting loads. The aboveground portion may provide the benefit of an A-frame shape as described above, and the belowground portion may provide the benefit of a curved pile interacting with the soil as described above. A further advantage underground may also be that the horizontal component of an uplift force on each of piles 20 forces the soil to partially compress into the other pile 20, thereby further increasing resistance to pile movement in an upward direction.

Figure 16:
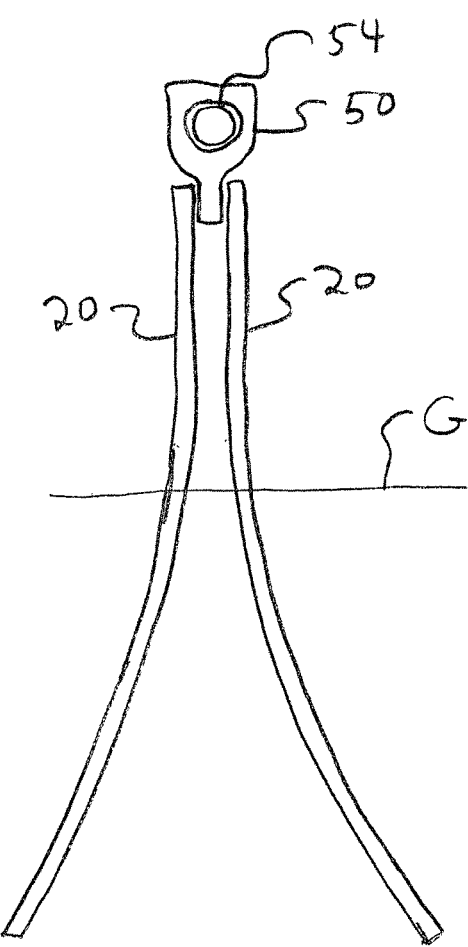
FIG. 16 is a side elevation view of an embodiment using straight piles that are curved outwardly.

FIG. 16 shows an embodiment of the present invention comprising an alternate shape for piles 20. In this embodiment piles 20 are substantially straight and vertical aboveground and then curving outward underground. As described above piles 20 may be pre-bent or bent by guide assembly 40. Such a configuration may provide advantages under certain types of loads, for example when there is less lateral loading and more vertical loading on pile 20.

Figure 17:
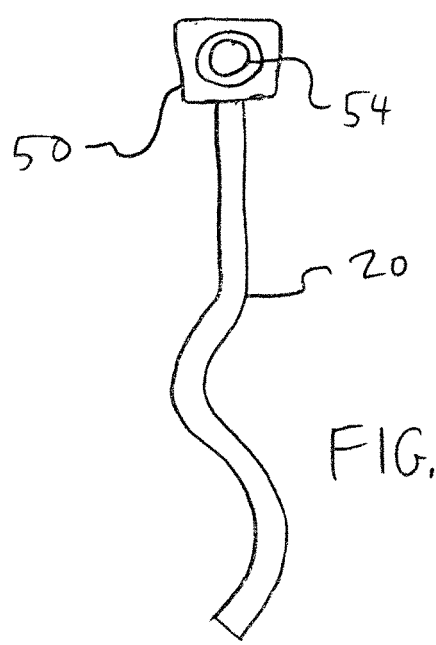
FIG. 17 is a side elevation view of an embodiment using a single bent pile.

FIG. 17 shows an embodiment of the present invention with a single pile 20 that is either pre-bent or bent onsite as described above. Such a configuration may provide advantages for vertical loading on pile 20 or where backward compatibility with single-pile systems is required.

In other embodiments piles 20 may be bent around any combination of the x, y, and z axes and still be within the scope of the present invention. For example, some embodiments comprise piles 20 that are twisted around the z or vertical axis to form helical or semi-helical shapes, whereas others contemplate a combination of multiple piles with varying curvature around the x and y axes to form a partially circular splayed pattern or a root-like underground structure.

In its various aspects, the present system thus provides a guided multiple pile driving system for driving piles and creating various pre-determined aboveground and underground structures. The system is capable of creating various predetermined underground structures, such as two or more piles separated by a distance, running at angles to each other, and/or curved, and various predetermined aboveground structures, such as two or more piles separated by a distance, running parallel to each other, running at angles to each other to form an A-frame or quasi A-frame structure, and/or curved. Each individual pile member may form a particular, predetermined aboveground and underground structure. The system comprises a guide assembly and an actuator for moving piles through the guide assembly. In its various preferred aspects, the actuator engages a side portion of the pile to drive the pile into the ground. This actuator may optionally comprise a gear that meshes with a series of slots or teeth in the pile, an impact force system that includes a ratchet that engages a series of slots or teeth on the piles, or even one or more rollers or that engage with the side portions of the piles to drive the piles into the ground.

What is claimed:

1. A machine for driving foundation components comprising:
   at least one loading mechanism configured to hold a pair of elongated piles;
   a single drive mechanism, the single drive mechanism, operable to drive the pair of elongated piles into supporting ground from the at least one loading mechanism at substantially the same time by engaging features that run along the length of each pile.

2. The machine according to claim 1, wherein the single drive mechanism is operable to drive the pair of piles so that respective above-ground ends of the piles are adjacent and angled towards one another.

3. The machine according to claim 1, wherein the single drive mechanism is operable to drive the pair of piles so that they are offset with respect to an orthogonal line between them.

4. The machine according to claim 1, wherein the single drive mechanism is operable to drive the two piles into the ground so that are aligned with one another with respect to an orthogonal line between them.

5. The machine according to claim 1, wherein the single drive mechanism is a worm gear assembly.

6. The machine according to claim 1, wherein the single drive mechanism is an impact driver.

7. The machine according to claim 1, wherein the single drive mechanism imparts axial force to drive the elongated plies.

8. A foundation member driving machine comprising:
   a feed mechanism for receiving two elongated foundation members; and
   a single drive assembly, wherein the single drive assembly is operable to drive the two elongated foundation members into supporting ground at substantially the same time by engaging features that run along the length of each pile.

9. The machine according to claim 8, where the single drive mechanism is operable to drive the two elongated foundation members into supporting ground so that respective above-ground ends of the pair of piles are angled towards one another.

10. The machine according to claim 8, wherein the single drive mechanism is operable to drive the two elongated foundation members into the ground so that they are offset from one another with respect to an orthogonal line between them.

11. The machine according to claim 8, wherein the single drive mechanism is operable to drive the two elongated foundation member into the ground so that they are aligned with respect to an orthogonal line between them.

12. The machine according to claim 8, wherein the single drive mechanism is a worm gear assembly.

13. The machine according to claim 8, wherein the single drive mechanism is an impact driver.

14. The machine according to claim 8, wherein the single drive mechanism imparts axial force to drive the elongated foundation members.

15. A method of driving a pair of piles at substantially the same time with a pile driving machine comprising:
  loading a pair of piles into a feed mechanism of the machine;
  actuating a single drive mechanism; and
  driving the pair of piles into supporting ground at substantially the same time with the single drive mechanism by engaging features formed along the length of each pile with the drive mechanism to impart axial force to the piles.

16. The method according to claim 15, wherein driving the pair of piles into supporting ground with the single drive mechanism comprises impacting a portion of each pile to drive it into supporting ground.

* * * * *